(12) United States Patent
Yang et al.

(10) Patent No.: US 6,967,851 B2
(45) Date of Patent: Nov. 22, 2005

(54) APPARATUS FOR REDUCING THE POWER CONSUMPTION OF A PFC-PWM POWER CONVERTER

(75) Inventors: Ta-yung Yang, Milpitas, CA (US); Cheng-Chi Hsueh, Jhong-He (TW)

(73) Assignee: System General Corp., Taipei Hsien (TW)

( * ) Notice: Subject to any disclaimer, the term of this patent is extended or adjusted under 35 U.S.C. 154(b) by 92 days.

(21) Appl. No.: 10/737,557

(22) Filed: Dec. 15, 2003

(65) Prior Publication Data

US 2005/0128773 A1 Jun. 16, 2005

(51) Int. Cl.$^7$ .......................... H02M 3/335; G05F 1/10
(52) U.S. Cl. ................ 363/16; 363/21.04; 323/222; 323/282
(58) Field of Search ................ 363/21.4, 21.8, 363/16, 17, 97, 80, 49, 41; 323/222, 284, 323/282, 283, 286, 288

(56) References Cited

U.S. PATENT DOCUMENTS

| | | | |
|---|---|---|---|
| 5,313,381 A * | 5/1994 | Balakrishnan | ............... 363/147 |
| 5,565,761 A * | 10/1996 | Hwang | ........................ 323/222 |
| 5,903,138 A * | 5/1999 | Hwang et al. | ............... 323/266 |
| 6,233,161 B1 * | 5/2001 | Balakrishnan et al. | ......... 363/16 |
| 6,556,462 B1 * | 4/2003 | Steigerwald et al. | .......... 363/89 |

* cited by examiner

*Primary Examiner*—Rajnikant B. Patel
(74) *Attorney, Agent, or Firm*—J.C. Patents

(57) ABSTRACT

An apparatus for reducing the power consumption of a PFC-PWM power converter is described. The apparatus includes a control terminal used to detect a line-input voltage and to control a PFC signal and a PWM signal. The apparatus further includes a PFC power-manager and a PWM power-manager. The PFC power-manager of the PFC controller determines a PFC-reference voltage for an error amplifier of the PFC controller. The PFC-reference voltage is generated in response to the voltage at the control terminal. The PFC power-manager will disable the PFC signal whenever the voltage at the control terminal drops below a low-voltage threshold voltage. The PWM power-manager will disable the PWM signal whenever the voltage at the control terminal drops below a programmable threshold voltage. Furthermore, the PWM power-manager will pull the voltage at the control terminal low to disable the PFC circuitry during light-load and zero-load conditions.

6 Claims, 5 Drawing Sheets

APPARATUS FOR REDUCING THE POWER CONSUMPTION OF A PFC-PWM POWER CONVERTER

BACKGROUND OF THE INVENTION

1. Field of the Invention

The present invention generally relates to the art of switching mode power converters. More particularly, the present invention relates to PFC-PWM power converters.

2. Description of Related Art

Many power converters apply power factor correction (PFC) to correct the line current and subsequently generate a sinusoidal input current waveform that is in phase with the line voltage. Adding a PFC circuitry to the front end of a DC-to-DC power converter can prevent unnecessary power loss and heat dissipation from occurring in the power distribution system.

Unfortunately, traditional PFC circuits internally consume substantial amounts of power. This is especially significant under light-load and zero-load conditions. Because of this, traditional power converters often fail to meet government-mandated power conservation requirements.

The objective of the present invention is to provide an apparatus to reduce the power consumption of a PFC-PWM power converter under full-load and light-load conditions. Furthermore, in order to protect the PFC circuitry from over-stress operation and further reduce power consumption, the apparatus according to the present invention disables the power converter during brownout conditions.

SUMMARY OF THE INVENTION

The present invention provides an apparatus for reducing the power consumption of a PFC-PWM power converter. The apparatus according to the present invention includes a PFC power-manager and a PWM power-manager. The apparatus also includes a control terminal applied to detect the line-input voltage and control a PFC signal and a PWM signal.

The PFC power-manager generates a PFC-reference voltage for an error amplifier of the PFC controller in response to the voltage at the control terminal. The PFC power-manager will disable the PFC signal whenever the voltage at the control terminal drops below a low-voltage threshold.

The PWM power-manager will disable the PWM signal whenever the voltage at the control terminal drops below a programmable threshold voltage. A feedback voltage of the PWM controller will decrease in response to the decrease of the load of the power converter. Whenever the feedback voltage of the PWM controller drops below a low-load threshold, the PWM power-manager will pull the voltage at the control terminal low. This will disable the PFC signal.

The PFC power-manager controls the output voltage of the PFC boost converter in response to the voltage range of the line-input. This enables the PFC-PWM controller to optimize the efficiency of the PFC boost converter and reduce power consumption under full-load conditions.

During low-voltage line-input conditions, such as brown-outs, the PFC power-manager and the PWM power-manager will disable the PFC boost converter and the DC-to-DC power converter. This protects the PFC circuitry from over-stress operation and saves power. In addition, the PWM power-manager will disable the PFC boost converter during low-load conditions, to further reduce the power consumption of the power converter.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
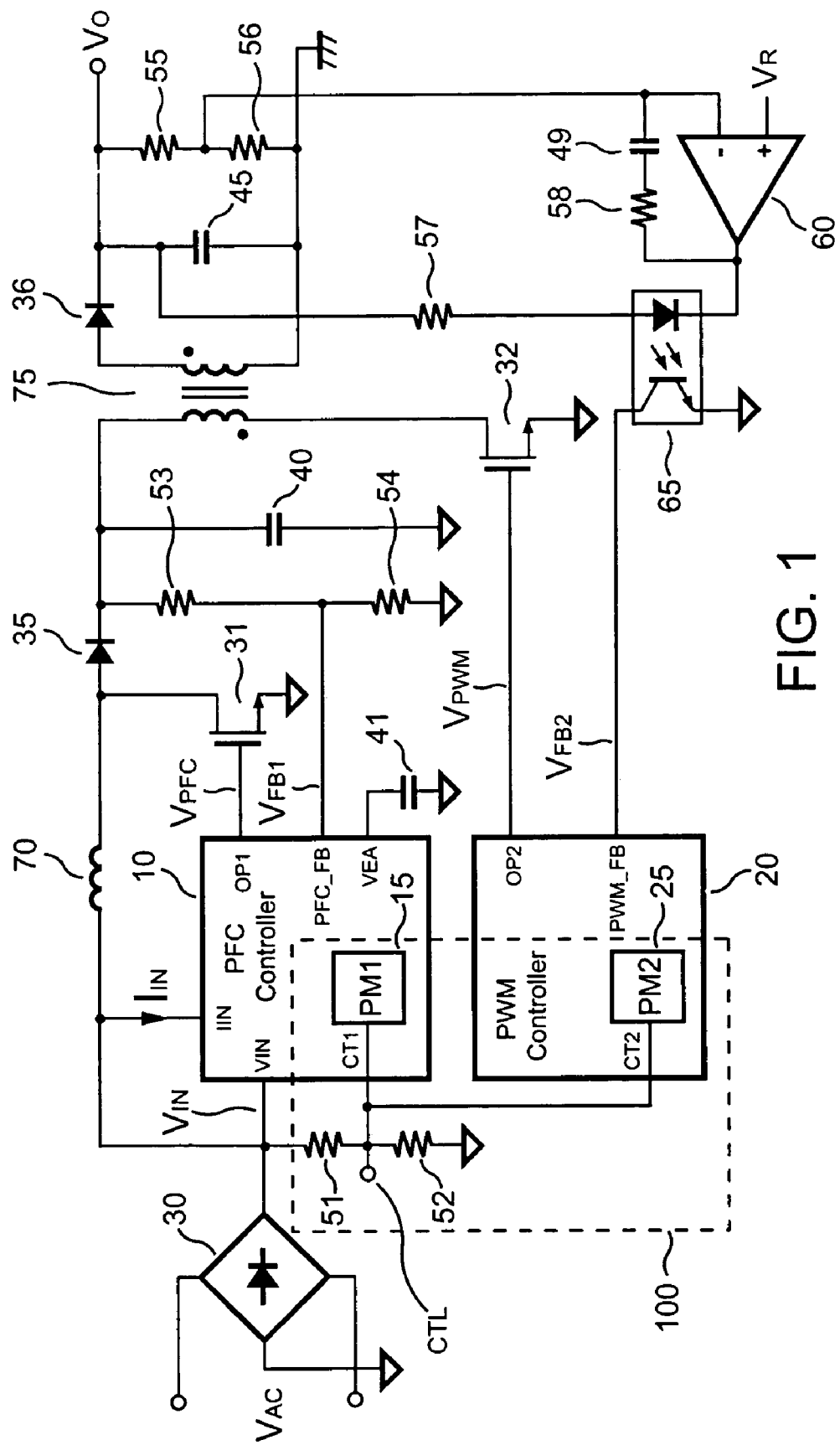
FIG. 1 shows a schematic circuit of a PFC-PWM power converter according to a preferred embodiment of the present invention.

FIG. 1 shows a schematic circuit diagram of a PFC-PWM power converter according to a preferred embodiment of the present invention. According to the present invention, an apparatus 100 is included to reduce the power consumption of the PFC-PWM power converter. The PFC-PWM power converter includes a PFC controller 10. The PFC controller 10 includes a line-voltage input terminal VIN, a line-current input terminal IIN, a PFC-control terminal CT1, a compensation terminal VEA, a PFC output terminal OP1, and a feedback input terminal PFC_FB. The line-voltage input terminal VIN is used to detect the line-input voltage information. The line-current input terminal IIN is applied to detect the line-input current information.

The PFC-PWM power converter includes a PFC boost converter. The PFC boost converter comprises an inductor 70, a rectifier 35, a switching device 31, and a capacitor 40. The PFC boost converter produces a PFC output voltage across the capacitor 40. The PFC boost converter further includes a voltage divider connected between a cathode of the rectifier 35 and a ground reference. The voltage divider consists of a resistor 53 and a resistor 54 connected in series. The voltage divider creates a PFC feedback-loop for providing a PFC feedback voltage $V_{FBI}$ to the feedback input terminal PFC_FB of the PFC controller 10.

The PFC boost converter further includes a capacitor 41 connected to a compensation terminal VEA. The compensation terminal VEA is connected to an output of an error amplifier 131 (shown in FIG. 2) of the PFC controller 10. This is done to provide frequency compensation for the PFC feedback-loop. The PFC controller 10 also generates a PFC signal $V_{PFC}$ via the PFC output terminal OP1 to drive the switching device 31. The switching device 31 is used to regulate the PFC output voltage and to create a sinusoidal input current waveform that is in-phase with the line-input voltage.

The PFC-PWM power converter also includes a flyback DC-to-DC power converter. The flyback DC-to-DC power converter includes a transformer 75, a switching device 32, a rectifier 36, and a capacitor 45. The flyback DC-to-DC power converter further includes a resistor 55, a resistor 56 and an error amplifier 60. These two resistors 55 and 56 are applied to sense an output voltage $V_O$ of the flyback DC-to-DC power converter.

A negative input of the error amplifier 60 is connected to a joint of the two resistors 55 and 56. The error amplifier 60 also includes a positive input supplied with a reference voltage $V_R$ for regulating the output voltage $V_O$. The resistors 55 and 56 are coupled with the error amplifier 60 and an optical-coupler 65 to build a PWM feedback-loop. A resistor 58 is connected with a capacitor 49 to provide frequency compensation for the PWM feedback-loop. The PFC-PWM power converter also includes a PWM controller 20. The PWM controller 20 includes a feedback input terminal PWM_FB, a PWM-control terminal CT2, and a PWM output terminal OP2. An output of the optical-coupler 65 provides a PWM feedback voltage $V_{FB2}$ to the feedback input terminal PWM_FB of the PWM controller 20. In response to the PWM feedback voltage $V_{FB2}$, the PWM controller 20 generates a PWM signal $V_{PWM}$ via the PWM output terminal OP2 to drive the switching device 32. This is done to regulate the output voltage $V_O$ of the flyback DC-to-DC power converter.

The PWM feedback voltage $V_{FB2}$ is decreased in response to the load decrease in the flyback DC-to-DC power converter. The PFC-PWM power converter further includes a control terminal CTL. The control terminal CTL is used to detect the line-input voltage and to control the PFC signal $V_{PFC}$. A first terminal of a resistor 51 is connected to an output of a bridge rectifier 30. In this manner, a line-input voltage $V_{IN}$ is supplied to the first terminal of the resistor 51. A second terminal of a resistor 52 is connected to the ground reference. A second terminal of the resistor 51 and a first terminal of the resistor 52 are connected to the control terminal CTL.

The PFC controller 10 includes a PFC power-manager 15. An input of the PFC power-manager 15 is connected to the PFC-control terminal CT1 of the PFC controller 10. The PFC-control terminal CT1 of the PFC controller 10 is further connected to the control terminal CTL. The PFC power-manager 15 supplies a PFC-reference voltage to the error amplifier 131 of the PFC controller 10. The PFC-reference voltage is determined in response to the voltage at the control terminal CTL. The PFC power-manager 15 will disable the PFC signal $V_{PFC}$ during an inhibit-mode. The inhibit-mode is enabled whenever a low-voltage condition is sustained longer than an inhibit-delay time. The low-voltage condition means that the voltage at the control terminal CTL is lower than a low-voltage threshold voltage $V_{R2}$.

The PWM controller 20 includes a PWM power-manager 25. An input of the PWM power-manager 25 is connected to the PWM-control terminal CT2 of the PWM controller 20. The PWM-control terminal CT2 of the PWM controller 20 is also connected to the control terminal CTL. The PWM power-manager 25 will pull the voltage at the control terminal CTL low during a standby-mode. The standby-mode is enabled whenever a low-load condition is sustained longer than a standby delay-time. The low-load condition indicates that the PWM feedback voltage $V_{FB2}$ is lower than a low-load threshold voltage $V_{R5}$.

Furthermore, the PWM power-manager 25 will disable the PWM signal $V_{PWM}$ during a stop-mode. The stop-mode is enabled whenever a brownout condition is sustained longer than a stop delay-time. The brownout condition occurs whenever the voltage at the control terminal CTL is lower than a programmable threshold voltage. When the standby mode is enabled or disabled, a specific threshold voltage will be determined as the programmable threshold voltage.

Figure 2:
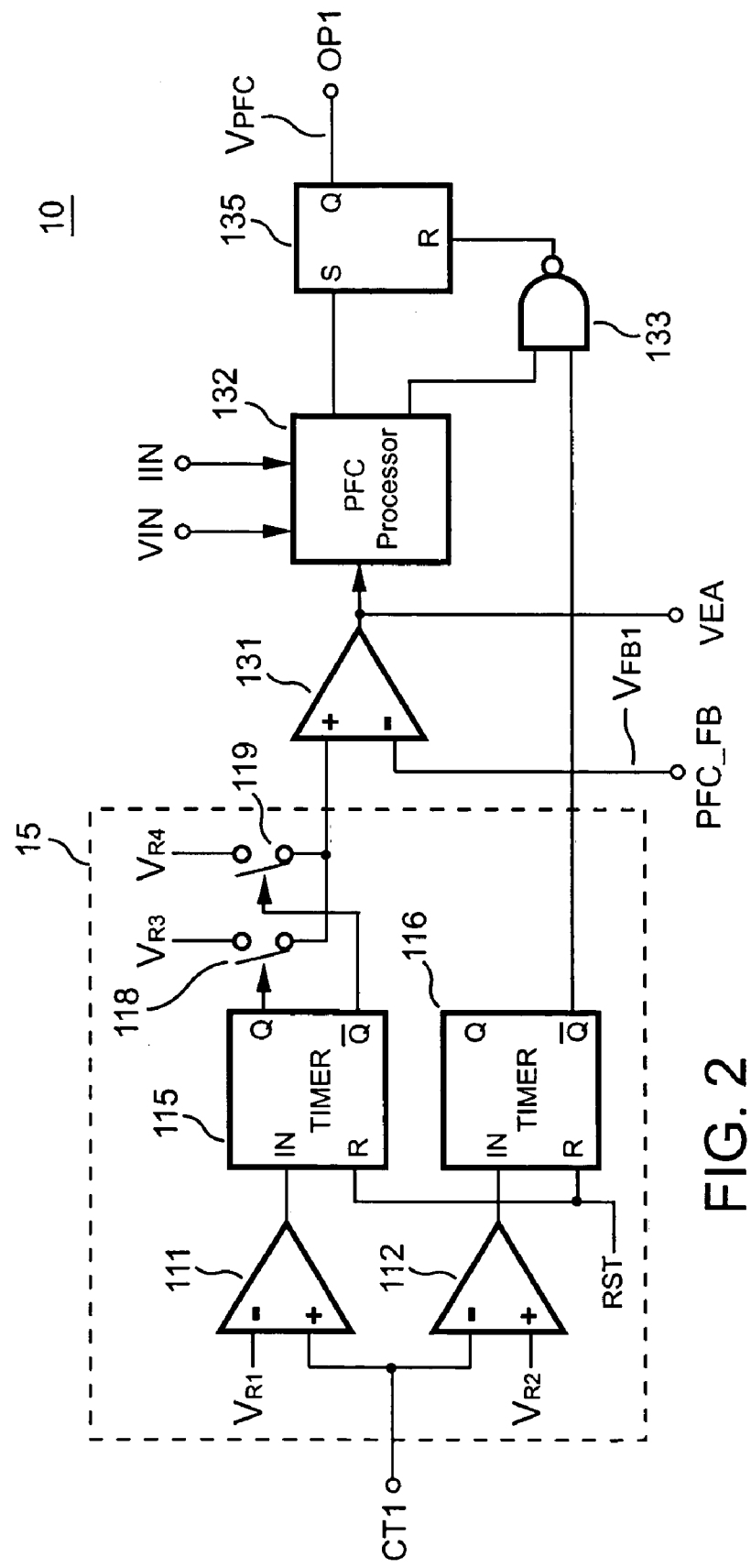
FIG. 2 shows a PFC controller according to a preferred embodiment of the present invention.

FIG. 2 shows the PFC controller 10 according to a preferred embodiment of the present invention. The PFC controller 10 includes a comparator 111, a comparator 112, a high-voltage-delay timer 115, an inhibit-delay timer 116, a switch 118, a switch 119, a PFC processor 132, a NAND-gate 133, a SR flip-flop 135, and the error amplifier 131.

The PFC processor 132 utilized to generate a switching signal. The switching signal sets/resets the PFC signal $V_{PFC}$ in response to an output signal of the error amplifier 131, the line-input voltage $V_{IN}$, and a line-input current $I_{IN}$. A set-input of the S-R flip-flop 135 is connected to a first output of the PFC processor 132. A reset-input of the S-R flip-flop 135 is connected to an output of the NAND-gate 133. An output of the SR flip-flop 135 is connected to the PFC output terminal OP1 of the PFC controller 10 for supplying the PFC signal $V_{PFC}$. A first input of the NAND-gate 133 is connected to a second output of the PFC processor 132. A negative input of the error amplifier 131 is connected to the feedback input terminal PFC_FB. The output of the error amplifier 131 is connected to the compensation terminal VEA. The feedback input terminal PFC_FB is connected to a junction of the resistor 53 and the resistor 54 shown in FIG. 1.

The comparator 111 is applied to generate a high-voltage condition in response to the voltage at the control terminal CTL. A positive input of the comparator 111 is connected to the PWM-control terminal CT1. A negative input of the comparator 111 is supplied with a range threshold voltage $V_{R1}$. A comparator 112 is used to indicate the presence of a low-voltage condition in response to the voltage at the control terminal CTL. A positive input of the comparator 112 is supplied with the low-voltage threshold voltage $V_{R2}$. A negative input of the comparator 112 is connected to the PFC-control terminal CT1.

The high-voltage-delay timer 115 generates a high-voltage delay-time. Whenever the voltage at the PFC-control terminal CT1 exceeds the range threshold voltage $V_{R1}$, the high-voltage condition will be created. The high-voltage-delay timer 115 is used to ensure that the high-voltage condition will sustain longer than the high-voltage delay-time. An input of the high-voltage-delay timer 115 is connected to an output of the comparator 111.

The inhibit-delay timer 116 generates the inhibit-delay time. Whenever the voltage at the PFC-control terminal CT1 drops below the low-voltage threshold voltage $V_{R2}$, the low-voltage condition will be created. The inhibit-delay timer 116 is used to ensure that the low-voltage condition will sustain longer than the inhibit-delay time. An input of the inhibit-delay timer 116 is connected to an output of the comparator 112. The reset-inputs of the high-voltage-delay timer 115 and the inhibit-delay timer 116 are both driven by a power-on reset signal RST. A negative output of the inhibit-delay timer 116 generates an inhibit signal. The inhibit signal is supplied to a second input of the NAND-gate 133 to disable the PFC signal $V_{PFC}$.

Two switches 118 and 119 are used to supply the PFC-reference voltage to the error amplifier 131. The input terminals of the switches 118 and 119 are respectively supplied with a reference voltage $V_{R3}$ and a reference voltage $V_{R4}$. The output terminals of the switches 118 and 119 are both connected to a positive input of the error amplifier 131. A control terminal of the switch 118 is connected to a positive output of the high-voltage-delay timer 115. A control terminal of the switch 119 is connected to a negative output of the high-voltage-delay timer 115.

Figure 3:
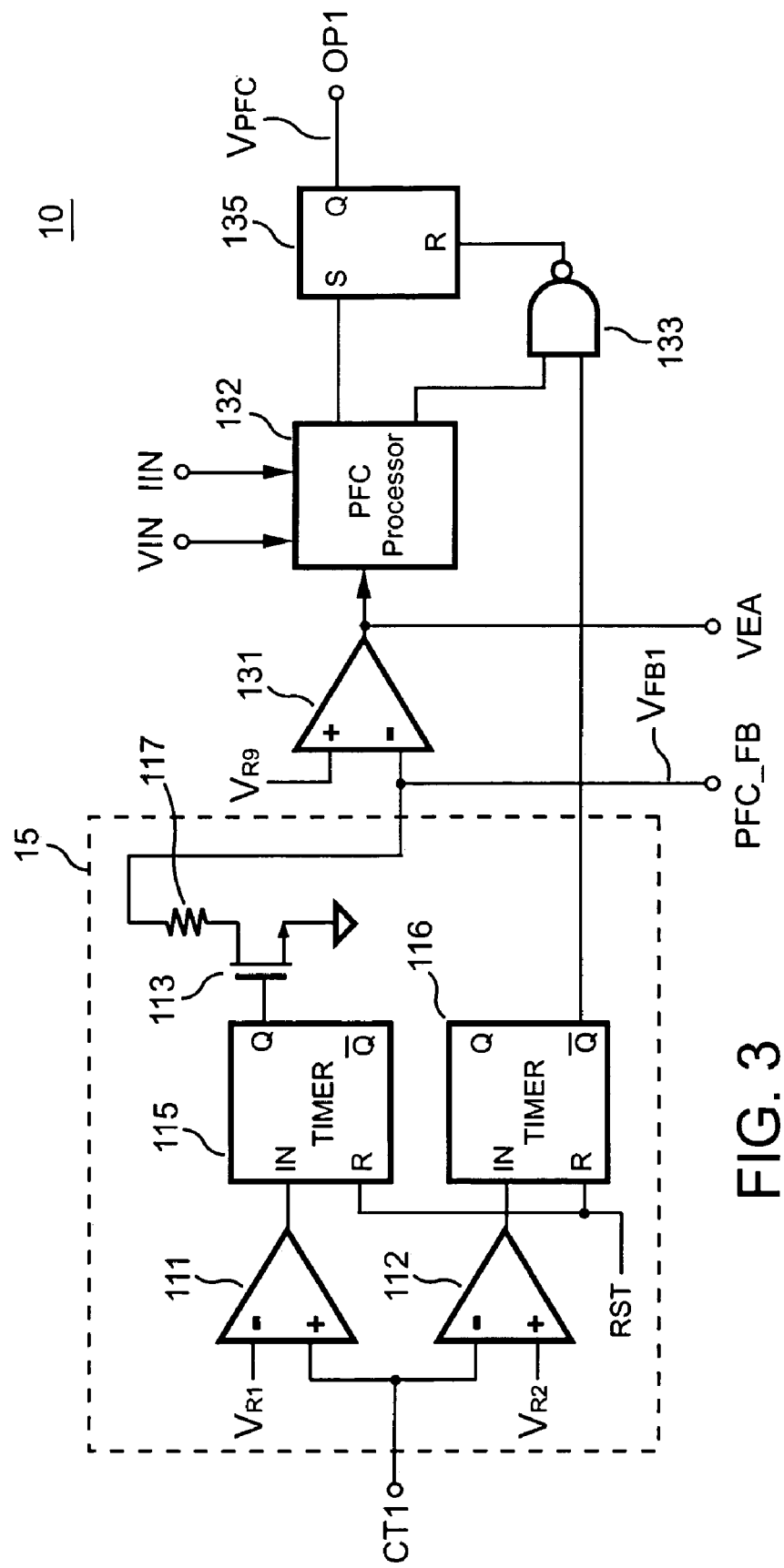
FIG. 3 shows a PFC controller according to another preferred embodiment of the present invention.

FIG. 3 shows the PFC controller according to another preferred embodiment of the present invention, wherein the PFC controller according to this embodiment is similar to the PFC controller 10 shown in FIG. 2 except that the two switches 118 and 119 are being replaced by a transistor 113 and a resistor 117. In response to the voltage at the PFC-control terminal CT1, the PFC power-manager 15 of the PFC controller 10 will vary the resistance of a negative input of the error amplifier 131. The negative input of the error amplifier 131 is connected to the feedback input terminal PFC_FB. A positive input of the error amplifier 131 is supplied with a reference voltage $V_{R9}$.

The PFC power-manager 15 includes the transistor 113 and the resistor 117 to control the resistance of the negative input of the error amplifier 131. A gate of the transistor 113 is driven by a positive output of the high-voltage-delay timer 115. A source of the transistor 113 is connected to the ground reference. A drain of the transistor 113 is connected to the negative input of the error amplifier 131 via the resistor 117. When the line-input operates in high-voltage range, the PFC power-manager 15 will decrease the resistance of the voltage divider. This increases the PFC output voltage of the PFC boost converter.

Figure 4:
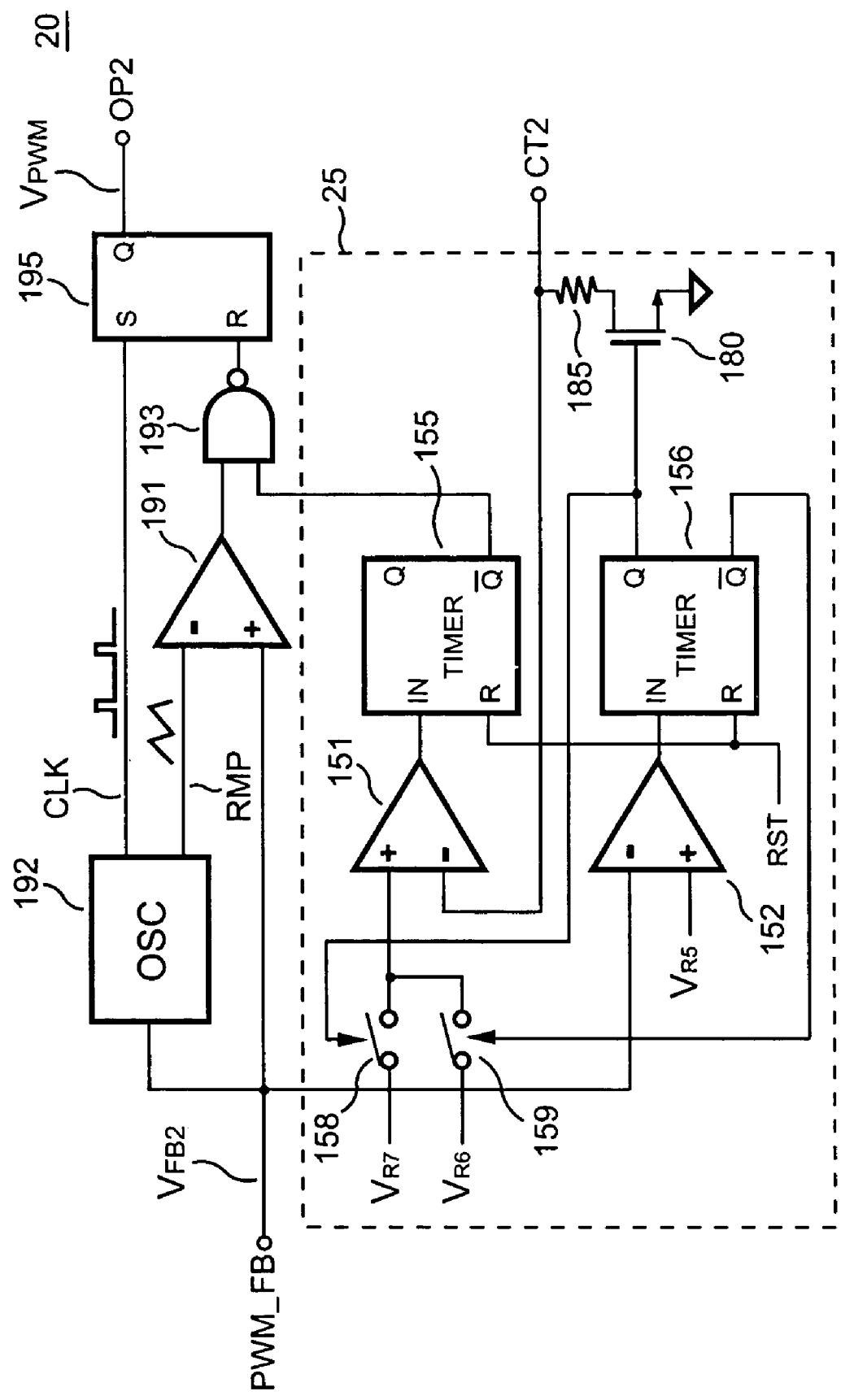
FIG. 4 shows a PWM controller according to a preferred embodiment of the present invention.

FIG. 4 shows the PWM controller 20 according to a preferred embodiment of the present invention. The PWM controller 20 includes the PWM power-manager 25, an oscillator 192, a comparator 191, a NAND-gate 193, and a SR flip-flop 195. The oscillator 192 generates a clock-signal CLK. The clock-signal CLK is supplied to a set-input of the SR flip-flop 195 to initiate a switching cycle. A positive input of the comparator 191 is coupled to the feedback input terminal PWM_FB. The oscillator 192 also generates a ramp-signal RMP. The ramp-signal RMP is supplied to a negative input of the comparator 191. When the voltage level of the ramp-signal RMP exceeds the PWM feedback voltage $V_{FB2}$, the comparator 191 will supply a logic-low signal to a first input of the NAND-gate 193. This will reset the SR flip-flop 195 and disable the PWM signal $V_{PWM}$.

The PWM power-manager 25 has the PWM-control terminal CT2 connected to the control terminal CTL. The PWM power-manager 25 includes a comparator 152. This is used for indicating the presence of a low-load condition in response to the PWM feedback voltage $V_{FB2}$. A negative input of the comparator 152 is connected to the feedback input terminal PWM_FB. A positive input of the comparator 152 is supplied with the low-load threshold voltage $V_{R5}$.

A comparator 151 is used for indicating the brownout status in response to the voltage at the control terminal CTL. A positive input of the comparator 151 is supplied with the programmable threshold voltage. A negative input of the comparator 151 is connected to the PWM-control terminal CT2.

A stop-delay timer 155 has a stop-delay time to ensure the brownout status sustains longer than the stop-delay time. An input of the stop-delay timer 155 is connected to an output of the comparator 151. A negative output of the stop-delay timer 155 is connected to a second input of the NAND-gate 193.

A standby-delay timer 156 has the standby-delay time to ensure the low-load condition sustains longer than the standby-delay time. An input of the standby-delay timer 156 is connected to an output of the comparator 152. The reset inputs of the stop-delay timer 155 and the standby-delay timer 156 are both driven by the power-on reset signal RST.

The input terminals of switches 158 and 159 are supplied with a reference voltage $V_{R7}$ and a reference voltage $V_{R6}$, respectively. The output terminals of the switches 158 and 159 are connected to the positive input of the comparator 151. A control terminal of the switch 158 is connected to a positive output of the standby-delay timer 156. A control terminal of the switch 159 is connected to a negative output of the standby-delay timer 156. A gate of a transistor 180 is connected to the positive output of the standby-delay timer 156. A source of the transistor 180 is connected to the ground reference. A drain of the transistor 180 is connected to the PWM-control terminal CT2 via a resistor 185. The PWM-control terminal CT2 is further connected to the control terminal CTL.

Figure 5:
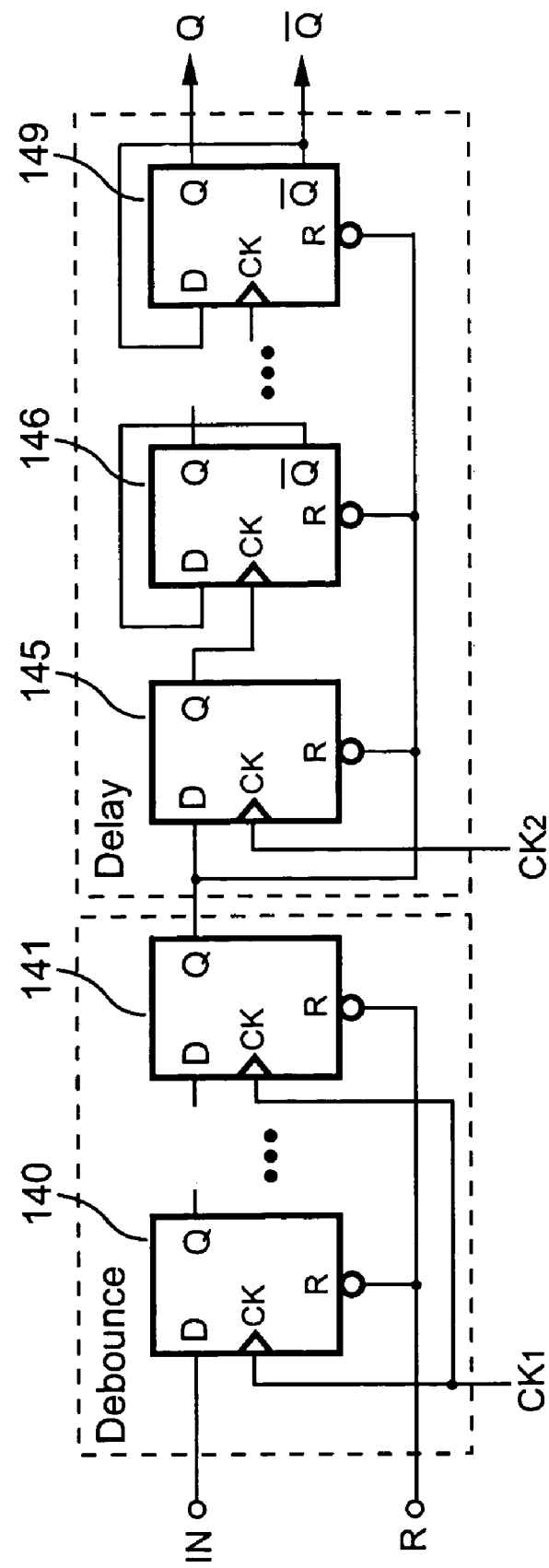
FIG. 5 shows a timer according to a preferred embodiment of the present invention.

FIG. 5 shows a timer for producing a delay-time according to a preferred embodiment of the present invention. This demonstrates one possible implementation of the high-voltage-delay timer 115, the inhibit-delay timer 116, the stop-delay timer 155, and the standby-delay timer 156. The timer includes a debounce stage and a delay stage connected in series. This protects the timer from noise interference and ensures that the input signal sustains longer than the delay-time.

The debounce stage also includes several D flip-flops connected in series. The clock-inputs of these D flip-flops are supplied with a clock-signal $CK_r$. The reset-inputs of these D flip-flops in the debounce stage are supplied with the power-on reset signal RST. An output of the debounce stage is connected to an input of the delay stage. The delay stage also includes several D flip-flops connected in series as a binary counter. However, the reset-inputs of these D flip-flops in the delay stage are connected to the input of the delay stage. The input of the delay stage connects to a D-input of a first D flip-flop 145 of the delay stage. A clock-input of the first D flip-flop 145 is supplied with a clock-signal $CK_2$.

The PFC power-manager 15 will control the PFC output voltage of the PFC boost converter in response to the voltage of the line-input. For example, it will produce a 250VDC output when the line-input voltage source $V_{AC}$ is in the range of 90VAC~180VAC. The PFC power-manager 15 will produce a 380VDC output when the line-input voltage source $V_{AC}$ is in between 180VAC~265VAC. Because the PFC output voltage of the PFC boost converter is determined in response to the line-input voltage, the power consumption of the power converter under full-load conditions can be reduced. Furthermore, during low-voltage line-input conditions (eg. brownouts), the PFC power-manager 15 and the PWM power-manager 25 will disable the PFC boost converter and the DC-to-DC power converter. This can protect the PFC circuitry from over-stress operation while reducing power consumption. In addition, the PWM power-manager 25 will disable the PFC boost converter during low-load conditions. This further reduces the overall power consumption of the power converter. All of these measures contribute to more efficient operation on the part of the power converter.

It will be apparent to those skilled in the art that various modifications and variations can be made to the structure of the present invention without departing from the scope or spirit of the present invention. In view of the foregoing, it is intended that the present invention cover modifications and variations of this invention provided that they fall within the scope of the following claims and their equivalents.

What is claimed is:

1. An apparatus for reducing the power consumption of a PFC-PWM power converter comprising:

a control terminal for detecting a line-input voltage, wherein a voltage at said control terminal is used to control a PFC signal, wherein said PFC signal is utilized to drive switching devices of a PFC boost converter of said PFC-PWM power converter;

a first resistor having a first terminal supplied with said line-input voltage;

a second resistor having a second terminal connected to a ground reference, wherein a first terminal of said second resistor and a second terminal of said first resistor are connected to said control terminal;

a PFC power-manager of a PFC controller, having a PFC-control terminal connected to said control terminal; wherein said PFC power-manager determines a PFC-reference voltage for an error amplifier of said PFC controller in response to the voltage at said control terminal; wherein said PFC power-manager disables said PFC signal during an inhibit mode; wherein said inhibit mode is enabled when a low-voltage condition sustains longer than an inhibit-delay time; wherein said low-voltage condition means a voltage at said PFC-control terminal is lower than a low-voltage threshold voltage; and a PWM power-manager of a PWM controller, having a PWM-control terminal connected to said control terminal; wherein said PWM power-manager will pull the voltage at said control terminal low under a standby mode; wherein said standby mode is enabled when a low-load condition sustains longer than a standby-delay time; wherein said low-load condition means that a feedback voltage of said PWM controller is lower than a low-load threshold voltage; wherein said feedback voltage of said PWM controller decreases whenever a load of said PFC-PWM power converter decreases.

2. The apparatus for said PFC-PWM power converter as claimed in claim 1, wherein said PWM power-manager disables a PWM signal during a stop mode, wherein said stop mode is enabled when a brownout condition sustains longer than a stop-delay time; wherein said brownout condition means that the voltage at said control terminal is lower than a programmable threshold voltage; wherein enabling or disabling said standby mode determines said programmable threshold voltage; wherein said PWM signal is utilized to drive switching devices of a DC-to-DC power converter of said PFC-PWM power converter.

3. The apparatus for said PFC-PWM power converter as claimed in claim 1, wherein said PFC power-manager comprises:

a range comparator for generating a high-voltage condition in response to the voltage at said control terminal; wherein a positive input of said range comparator is connected to said PFC-control terminal; wherein a negative input of said range comparator is supplied with a range threshold voltage;

a low-voltage comparator for generating said low-voltage condition in response to the voltage at said control terminal; wherein a positive input of said low-voltage comparator is supplied with said low-voltage threshold voltage; wherein a negative input of said low-voltage comparator is connected to said PFC-control terminal;

a high-voltage-delay timer for generating a high-voltage-delay time, wherein said high-voltage-delay timer ensures that said high-voltage condition sustains longer than said high-voltage-delay time, wherein an input of said high-voltage-delay timer is connected to an output of said range comparator;

an inhibit-delay timer for generating said inhibit-delay time, wherein said inhibit-delay timer ensures that said low-voltage condition sustains longer than said inhibit-delay time, wherein an input of said inhibit-delay timer is connected to an output of said low-voltage comparator; wherein a negative output of said inhibit-delay timer generates an inhibit signal to disable said PFC signal; and a first PFC switch and a second PFC switch, wherein an input terminal of said first PFC switch is supplied with a first PFC reference voltage, wherein an input terminal of said second PFC switch is supplied with a second PFC reference voltage; wherein an output terminal of said first PFC switch and an output terminal of said second PFC switch are connected to a positive input of said error amplifier of said PFC controller; wherein said first PFC switch is controlled by a positive output of said high-voltage-delay timer, wherein said second PFC switch is controlled by a negative output of said high-voltage-delay timer.

4. The apparatus for said PFC-PWM power converter as claimed in claim 1, wherein said PWM power-manager comprises:

a low-load comparator, for generating said low-load condition in response to said feedback voltage of said PWM controller; wherein a negative input of said low-load comparator is supplied with said feedback voltage of said PWM controller; wherein a positive input of said low-load comparator is supplied with said low-load threshold voltage;

a brownout comparator for generating said brownout condition in response to the voltage at said control terminal; wherein a positive input of said brownout comparator is supplied with said programmable threshold voltage; wherein a negative input of said brownout comparator is connected to said PWM-control terminal;

a stop-delay timer for generating a stop-delay time, wherein said stop-delay timer ensures that said brownout condition sustains longer than said stop-delay time, wherein an input of said stop-delay timer is connected to an output of said brownout comparator;

a standby-delay timer for generating a standby-delay time, wherein said standby-delay timer ensures that said low-load condition sustains longer than said standby-delay time, wherein an input of said standby-delay timer is connected to an output of said low-load comparator;

a first PWM switch and a second PWM switch, wherein an input terminal of said first PWM switch is supplied with a first PWM reference voltage, wherein an input terminal of said second PWM switch is supplied with a second PWM reference voltage; wherein an output terminal of said first PWM switch and an output terminal of said second PWM switch are connected to said positive input of said brownout comparator for providing said programmable threshold voltage; wherein said first PWM switch is controlled by a positive output of said standby-delay timer, wherein said second PWM switch is controlled by a negative output of said standby-delay timer; and a standby transistor and a standby resistor, wherein a gate of said standby transistor is connected to said positive output of said standby-delay timer; wherein a source of said standby transistor is connected to said ground reference; wherein a drain of said standby transistor is connected to said PWM-control terminal via said standby resistor.

5. An apparatus for reducing the power consumption of a PFC-PWM power converter comprising:

a control terminal for detecting a line-input voltage, wherein a voltage at said control terminal is used to control a PFC signal; wherein said PFC signal is utilized to drive switching devices of a PFC boost converter of said PFC-PWM power converter;

a first resistor having a first terminal supplied with said line-input voltage;

a second resistor having a second terminal connected to a ground reference, wherein a first terminal of said second resistor and a second terminal of said first resistor are connected to said control terminal;

a PFC power-manager of a PFC controller having a PFC-control terminal connected to said control-terminal; wherein said PFC power-manager varies the resistance in a negative input of an error amplifier of said PFC controller in response to the voltage at said control terminal; wherein said PFC power-manager disables said PFC signal during an inhibit mode, wherein said inhibit mode is enabled when a low-voltage condition sustains longer than an inhibit-delay time; wherein said low-voltage condition means that a voltage at said PFC-control terminal is lower than a low-voltage threshold voltage; and a PWM power-manager of a PWM controller having a PWM-control terminal connected to said control terminal, wherein said PWM power-manager will pull the voltage at said control terminal low under a standby mode; wherein said standby mode is enabled when a low-load condition sustains longer than a standby-delay time; wherein said low-load condition means that a feedback voltage of said PWM controller is lower than a low-load threshold voltage; wherein said feedback voltage of said PWM controller decreases whenever a load of said PFC-PWM power converter decreases.

6. The apparatus for PFC-PWM controller as claimed in claim 5, wherein said PFC power-manager comprises:

a range comparator, for generating a high-voltage condition in response to the voltage at said control terminal; wherein a positive input of said range comparator is connected to said PFC-control terminal, wherein a negative input of said range comparator is supplied with a range threshold voltage;

a low-voltage comparator, for generating said low-voltage condition in response to the voltage at said control terminal; wherein a positive input of said low-voltage comparator is supplied with said low-voltage threshold voltage, wherein a negative input of said low-voltage comparator is connected to said PFC-control terminal;

a high-voltage-delay timer, for generating a high-voltage-delay time, wherein said high-voltage-delay timer ensures that said high-voltage condition sustains longer than said high-voltage-delay time, wherein an input of said high-voltage timer is connected to an output of said range comparator;

an inhibit-delay timer, for generating said inhibit-delay time, wherein said inhibit-delay timer ensures that said low-voltage condition sustains longer than said inhibit-delay time, wherein an input of said inhibit-delay timer is connected to an output of said low-voltage comparator; wherein a negative output of said inhibit-delay timer generates an inhibit signal to disable said PFC signal; and a range transistor and a range resistor, wherein a gate of said range transistor is connected to a positive output of said high-voltage-delay timer; wherein a source of said range transistor is connected to said ground reference; wherein a drain of said range transistor is connected to said negative input of said error amplifier of said PFC controller via said range resistor.

\* \* \* \* \*